United States Patent
Van Cleave et al.

(10) Patent No.: US 6,435,460 B1
(45) Date of Patent: Aug. 20, 2002

(54) PORTABLE TOOL SUPPORT STAND

(75) Inventors: Jeffrey Van Cleave, Troy; Eugene G. Eichhorn, Pinckney, both of MI (US)

(73) Assignee: Van Mark Products Corporation, Farmington Hills, MI (US)

( * ) Notice: Subject to any disclaimer, the term of this patent is extended or adjusted under 35 U.S.C. 154(b) by 0 days.

(21) Appl. No.: 09/706,096

(22) Filed: Nov. 3, 2000

Related U.S. Application Data

(60) Provisional application No. 60/163,605, filed on Nov. 4, 1999.

(51) Int. Cl.[7] .................... F16M 11/20; B21D 11/00; B25B 1/02
(52) U.S. Cl. .................... 248/164; 248/168; 72/319; 108/9; 269/139
(58) Field of Search ................ 248/164, 163.1, 248/432, 166, 168, 439, 440, 188.1, 188.6, 188.91, 431; 108/9, 118, 119; 269/88, 139; 182/153; 144/286.1; D15/140; 72/319

(56) References Cited

U.S. PATENT DOCUMENTS

| 131,239 | A | | 9/1872 | Adler et al. |
|---|---|---|---|---|
| 516,026 | A | | 3/1894 | Seaver |
| 934,701 | A | | 9/1909 | Swanson |
| 1,147,458 | A | | 7/1915 | Steely |
| 1,724,215 | A | * | 8/1929 | Moran ................... 248/168 |
| 1,975,857 | A | * | 10/1934 | McKenney ............. 108/9 |
| 2,181,566 | A | | 11/1939 | Jensen |
| 2,343,441 | A | | 3/1944 | Babcock et al. |
| 2,434,028 | A | | 1/1948 | Wieland |
| 3,937,343 | A | | 2/1976 | Spulak |
| 4,155,386 | A | * | 5/1979 | Alessio ................. 144/286.1 |
| D252,388 | S | | 7/1979 | Fjells-Jensen |
| 4,223,881 | A | | 9/1980 | Hickman |
| 4,415,149 | A | * | 11/1983 | Rees ..................... 269/88 |
| 4,713,957 | A | | 12/1987 | Eder et al. |
| D304,650 | S | * | 11/1989 | Price ..................... D6/429 |
| 4,909,491 | A | * | 3/1990 | Cheng ................... 269/16 |
| 5,067,535 | A | * | 11/1991 | Wolff .................... 144/286.1 |
| 5,105,862 | A | * | 4/1992 | Skinner et al. .......... 144/287 |
| 5,320,150 | A | * | 6/1994 | Everts et al. ............ 144/287 |
| 5,651,298 | A | | 7/1997 | Break et al. |
| 5,681,034 | A | * | 10/1997 | Noniewicz ............. 269/139 |
| 5,743,129 | A | | 4/1998 | Chubb et al. |
| 5,927,436 | A | * | 7/1999 | Schutz ................... 182/153 |
| 6,070,696 | A | | 6/2000 | Chubb et al. |
| D437,864 | S | * | 2/2001 | Van Cleave et al. ..... D15/140 |

FOREIGN PATENT DOCUMENTS

| CH | 403 677 | 6/1966 |
|---|---|---|
| FR | 2504429 | 10/1982 |
| GB | 2 206 069 A | 12/1988 |

OTHER PUBLICATIONS

Cidan Advertisement—Folding Machine Model SB.
JOUANEL Industrie Advertisement, 9–96.
SCHECHTL Advertisement, p. 80.
Van Mark Advertisement—Mark IV Industrial Portable Bending Brake.
Dimos Brochure, 11–91.

* cited by examiner

Primary Examiner—Anita King
(74) Attorney, Agent, or Firm—Brooks & Kushman P.C.

(57) ABSTRACT

A folding detachable stand for a portable tool that is used on a job site. The stand has front and rear legs connected in a scissor relationship on right and left sides. Rear braces extend from an intermediate portion of the rear legs to a central portion of a platform or a central portion of a portable bending brake. Quick connect pins and brackets are used to assemble elements of the stand together.

22 Claims, 4 Drawing Sheets

PORTABLE TOOL SUPPORT STAND

CROSS-REFERENCE TO RELATED APPLICATION

This application claims the benefit of U.S. Provisional Application No. 60/163,605 filed Nov. 4, 1999, titled "Portable Bending Brake Leg Stand" the specification of which is expressly incorporated herein by reference in its entirety.

TECHNICAL FIELD

The present invention relates to a support stand for a portable tool.

BACKGROUND ART

Portable bending brakes and other tools are generally either placed on a table or are placed on support stands that support the portable bending brake at a convenient working height. Prior art support stands include conference table type legs or specially designed support stands. Conference table legs are inexpensive but may break if improperly handled. Conference table legs are also relatively unstable, especially when forces are applied in a side to side, or longitudinal, direction.

One example of another type of prior art support stand is disclosed in U.S. Pat. No. 5,582,055 that discloses a support stand having a stabilizing assembly secured to conference table legs. While this design provides a measure of front to rear stability, it is still relatively unstable in the longitudinal, or side to side, direction. These and other support stand designs can be difficult to retrofit to different types of bending brakes and may be difficult to set up.

Conference table legs and other prior art support stands are not easily detachable from the portable bending brake or other tool and therefore add to the weight of the brake or tool, making it harder to carry or move from location to location. Support stands that are not detached from the brake or tool are typically folded to the body of the bending brake or tool and add to the bulk of the bending brake or tool.

These and other disadvantages and problems associated with prior art support stands for portable bending brakes or tools are addressed and resolved by Applicant's invention as summarized below.

DISCLOSURE OF INVENTION

According to the present invention a lightweight, sturdy and economical support stand is provided for portable bending brakes or tools. The support stand of the present invention is easy to assemble to a brake and may be retrofit to different styles of brakes or tools. A longitudinal bar connects the front legs and may be stood upon to provide front to rear stability.

In further accordance with the present invention a support stand for a portable brake is provided that has front and rear legs that are pivotally connected to each other on both sides of the brake with the upper ends of the front and rear legs being connected to rear and front rails of the brake, respectively. The bottom ends of the front legs are connected to a longitudinally extending bar. The bottom ends of the rear legs are provided with feet. Diagonally extending rear braces tie the rear legs to the brake.

A support stand for other types of tools, such as a saw table or slitter, may be provided that has front and rear legs on right and left sides of the tool. Each of the front and rear legs are pivotally connected to each other at an intermediate point on the legs. Each of the front and rear legs are connected on their upper ends to a plate. Two plates are preferably provided with one plate being attached to each of the right and left sides of the tool. Alternatively, instead of two plates, a single platform could be provided that is adapted to receive the upper ends of the front and rear legs on both right and left sides of the platform. The bottom ends of the front and rear legs are provided with feet. Diagonally extending rear braces tie the rear legs to the tool or platform and enhance side-to-side stability.

To facilitate assembly and disassembly, the front and rear legs are detachably connected on their top end to the plates or platform. The rear braces are detachably connected on their outer ends to the rear legs and are connected on their inner ends to a central portion of the tool or platform. The lower ends of the front legs may be pivotally connected to the longitudinally extending bar. The detachable connections use quick connect type pins that may be simply pulled out to detach the legs from the brake and detach the braces from the rear legs.

Plates are secured between the front and rear brake rails on which the brake is assembled. The plates include brackets for receiving the upper ends of the front and rear legs. The upper ends of the front and rear legs are connected to the brackets by means of quick connect pins. Alternatively, if a platform is provided for a tool the upper ends of the legs may be connected to brackets that are attached to the platform. The brackets may have a plurality of holes for receiving the quick connect pins wherein the height of the platform or tool may be changed by simply changing the holes that receive the quick connect pins.

The braces may be disconnected from the rear legs and may be pivoted to a stored position in which the braces are generally parallel to the rear brake rail or rear edge of the platform of a tool stand. In the stored position, the braces are flush with the bottom of the brake or tool to facilitate loading and transporting the brake or tool.

When the front and rear legs are detached from the brake or platform, the rear legs may be pivoted to a parallel position relative to the front legs. To make the legs and longitudinal bar easier to carry it may be further broken down by detaching the front legs from the longitudinal bar in the portable bending brake embodiment or, if it is easier for the operator, the front legs and rear legs may be left attached to the longitudinal bar after the front and rear legs are detached from the brake. The front and rear legs pivot to a position where they are parallel to the longitudinal bar for compact transportation and storage.

These and other objects and advantages of the present invention will be better understood upon review of the attached drawings and in light of the following detailed description of the invention.

BEST MODE FOR CARRYING OUT THE INVENTION

Figure 1:
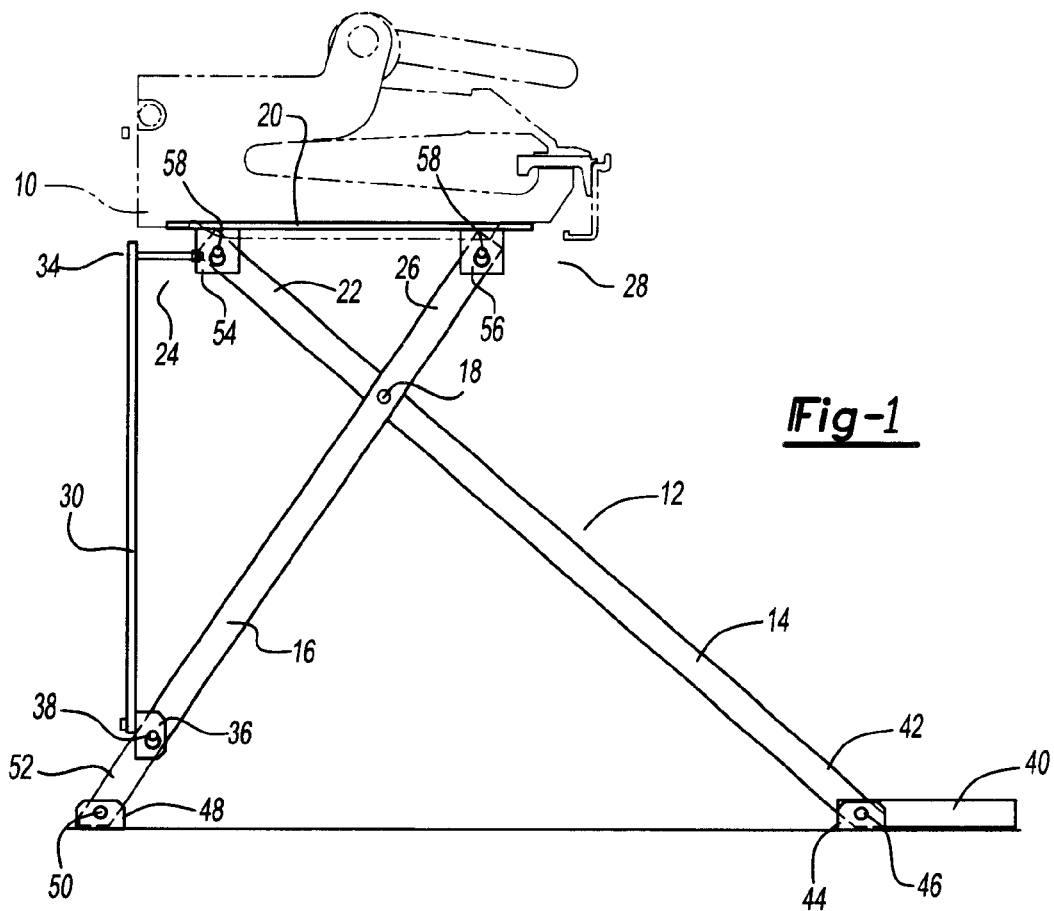
FIG. 1 is a side elevation view of a support stand made in accordance with the present invention supporting a portable bending brake shown in phantom lines.
Figure 2:
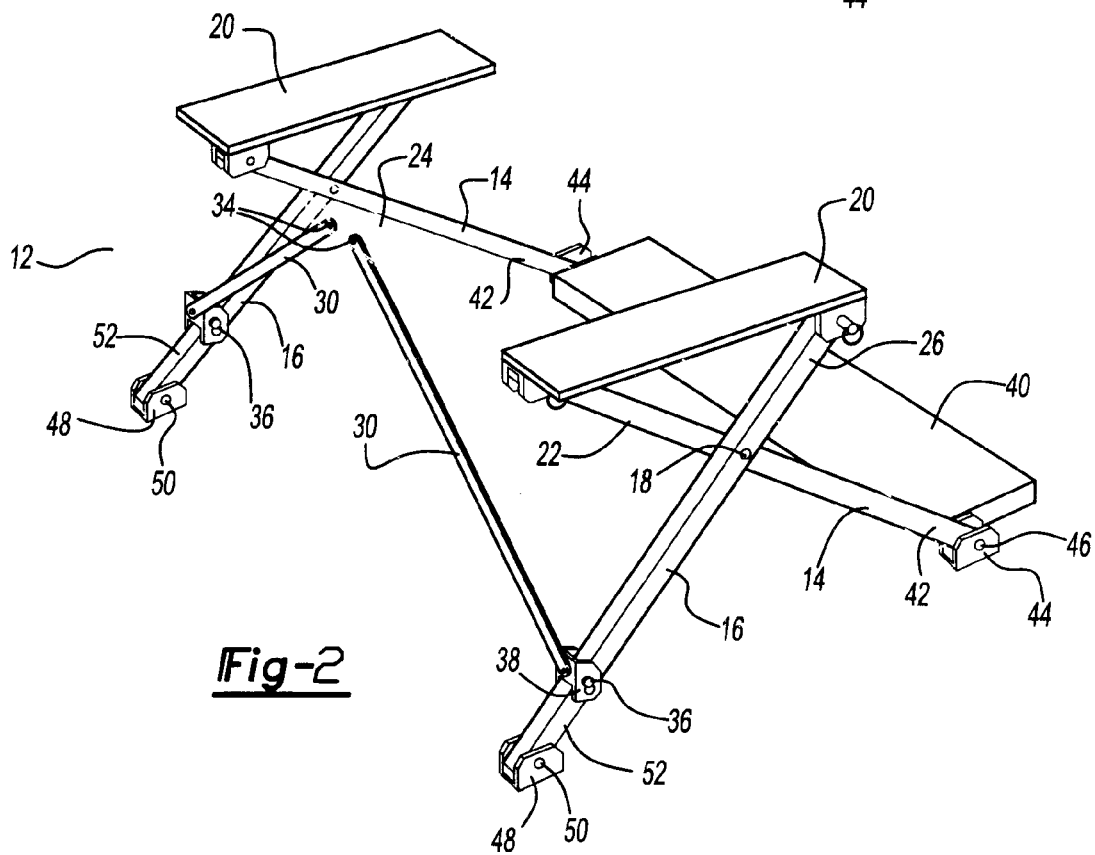
FIG. 2 is a perspective view of a support stand for a portable brake or other tool made in accordance with the present invention.
Figure 3:
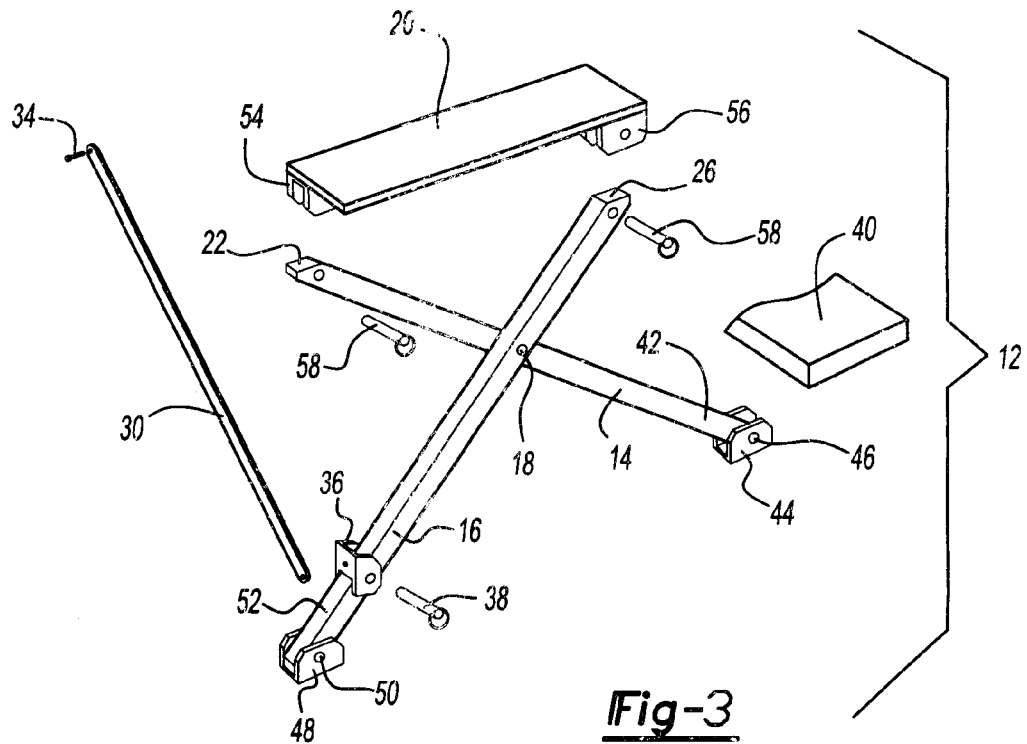
FIG. 3 is a partial exploded view of a support stand for a portable brake or other tool made in accordance with the present invention.

Referring now to FIGS. 1–3, a portable bending brake 10 is provided with a scissor support stand 12 in accordance with the invention. The scissor support stand 12 has two front legs 14 and two rear legs 16 that are connected together by two pivot connectors 18. The pivot connectors 18 provide a scissor-like connection between the front and rear legs 14 and 16. The length of front 14 and rear legs 16 as shown is not equal. As shown in FIG. 1, front legs 14 are longer than rear legs 16 to facilitate attachment to longitudinal bar 40. The scissor configuration allows legs to extend beyond footprint of brake for added stability depending upon the length of the legs.

Attachment plates 20 are used to connect the portable bending brake 10 to the scissor support stand 12. The upper ends 22 of the front legs 14 are connected to the attachment plates 20 adjacent the rear brake rail 24. The upper ends 26 of the rear legs 16 are connected to the attachment plates 20 adjacent the front rail 28.

Rear braces 30 are connected between lower portions of the rear leg 16 and the central portion of the rear brake rail 24. The rear braces 30 extend at approximately a 45° angle relative to the rear brake rail 24. The angle of the rear brace 30 may vary depending upon the length of the brake 10. Bolts 34 connect the rear braces 30 on one end to the rear brake rail 24. Brackets 36 are connected to the other ends of the rear braces 30 and are connected by quick connect pins 38 to the rear legs 16.

A longitudinal bar 40, or foot stand, extends in the longitudinal direction between the lower ends 42 of the front legs 14. The longitudinal bar 40 is connected to the lower ends 42 of the front legs 14 by means of a bracket 44 and a fastener 46 on each end. A user can stand on longitudinal bar 40 for added front to rear stability when operating the portable bending brake 10.

The rear legs 16 are provided with rear feet 48 that are connected by a quick connect pin 50 to the lower ends 52 of the rear legs 16. To reduce the number of different types of parts required to make the scissor support stand, the rear feet 48 may be made from one of the brackets used to connect other parts of the scissor support stand 12.

The scissor support stand 12 may be easily retrofit to a portable bending brake 10 by first fastening the attachment plates 20 by bolting or other well known fastening methods to the front brake rail 28 and rear brake rail 24. The upper ends 22 of the front legs 14 and the upper ends 26 of the rear legs 16 are then connected to brackets 54 and 56 by means of quick connect pins 58.

As used herein, quick connect pins are pins having a finger grasping ring on one end and a spring biased ball detent on the opposite end. The quick connect pins are inserted through corresponding holes in the brackets and the parts connected to the brackets. The quick connect pins allow for quick assembly and disassembly of the scissor support stand 12.

During assembly, if the user wants to use the longitudinal bar 40 for bending thicker materials or for greater stability, the longitudinal bar 40 may be attached to the lower ends 42 of the front legs 14. The lower ends 42 of the front legs are placed in the brackets 44 and secured in place with the fasteners 46. The lower ends 52 of the rear legs 16 are pivotally connected to the rear feet 48. The rear braces 30 are then connected by the bolts 34 to the rear brake rail 24 on their upper ends and the lower ends of the rear braces 30 are connected by brackets 36 and quick connect pins 38 to the rear legs 16. After initial assembly, it is not necessary to disconnect or reconnect the brackets 44 from its associated legs.

To disassemble the scissor support stand 12 from the bending brake 10 and break it down into its component parts it is only necessary to detach the braces 30 from the rear legs 16 by pulling the quick connect pins 38 and then detach the upper ends 22 of the front legs 14 and upper ends 26 of the rear legs 16 from the brackets 54 and 56 by removing their respective quick connect pins 58. The front legs 14 and rear legs 16 may be folded to a position in which they are parallel to each other. The legs 14, 16 can then be further collapsed by folding the front and rear sets of legs until they are in the same plane with the longitudinal bar, or plank, 40.

The braces may be disconnected from the rear legs and may be pivoted to a stored position in which the braces are generally parallel to the rear brake rail or rear edge of the platform of a tool stand.

Figure 4:
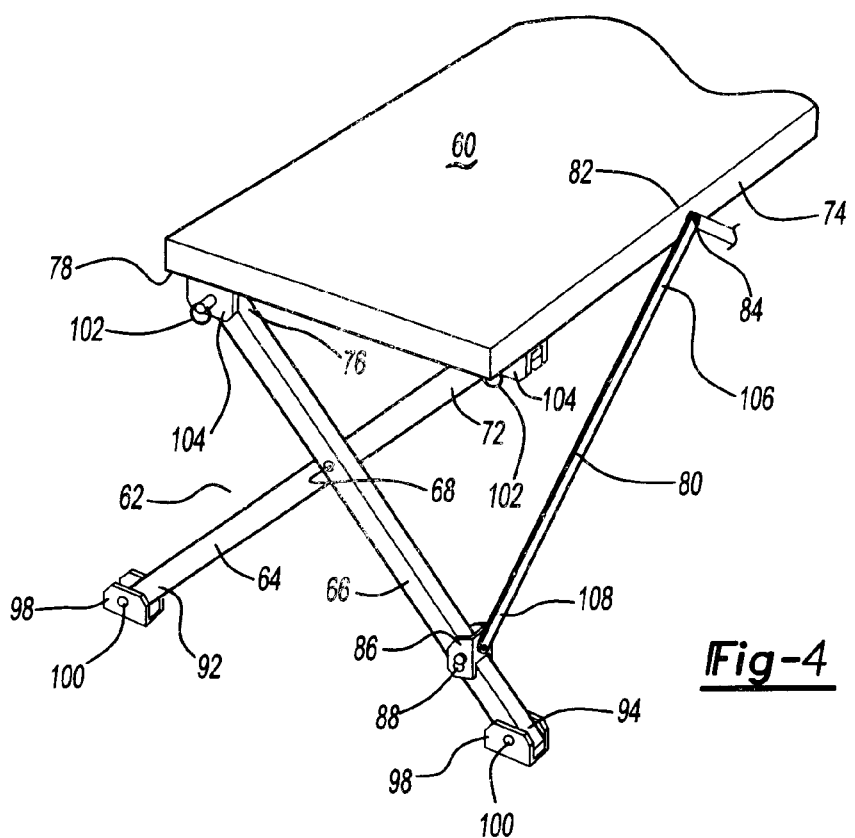
FIG. 4 is a partial perspective view of a support stand for a portable tool made in accordance with an alternative embodiment of the present invention.
Figure 5:
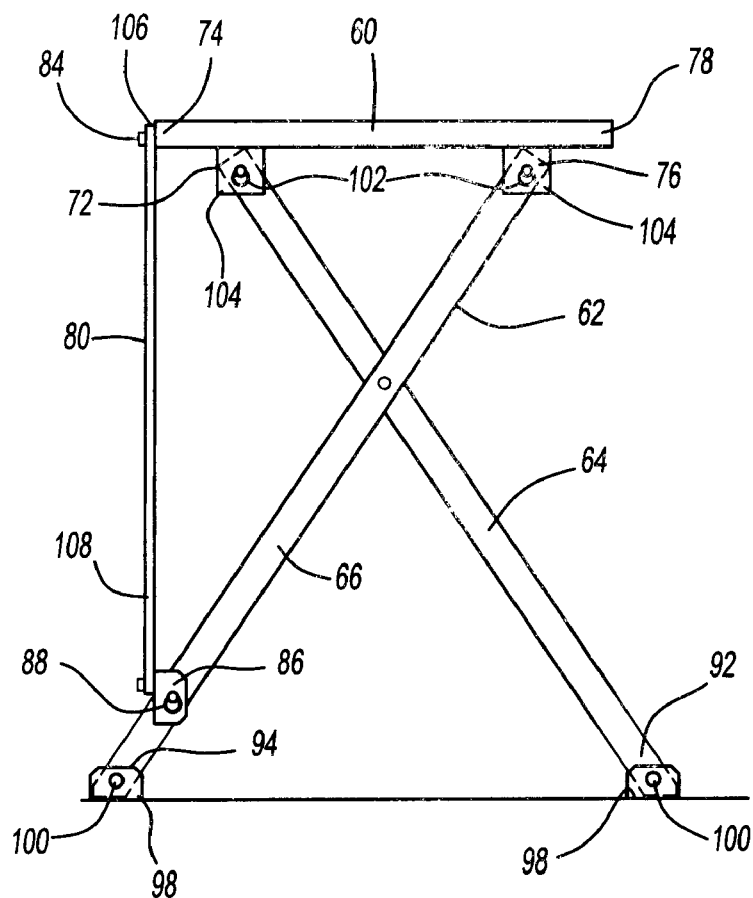
FIG. 5 is a side elevation view of a support stand for a portable tool made in accordance with the alternative embodiment of the present invention.

Referring now to FIGS. 4 and 5, a table or platform 60 for a portable tool is provided with a scissor support stand 62 made according to the invention. The scissor support stand 62 has two front legs 64 and two rear legs 66 that are connected together by two pivot connectors 68. The pivot connectors 68 provide a scissor-like connection between the front and rear legs 64 and 66.

Platform 60 is connected to the upper ends 72 of the front legs 64 near the rear edge 74 of the platform 60. The upper ends 76 of the rear legs 66 are connected near a front edge 78 of the platform 60.

The braces may be disconnected from the rear legs and may be pivoted to a stored position in which the braces are generally parallel to the rear brake rail or rear edge of the platform of a tool stand.

When the front and rear legs are detached from the brake or platform, the rear legs may be pivoted to a parallel position relative to the front legs. To make the legs and longitudinal bar easier to carry it may be further broken down by pivoting the front legs and rear legs to lie in the same plane as the longitudinal bar in the portable bending brake embodiment.

Rear braces 80 are connected between lower ends 94 of the rear leg 66 and a central portion 82 of the rear edge 74 of the platform 60. The rear braces 80 extend at approximately a 45° angle relative to the platform 60. The angle of the rear brace 80 may vary depending upon the length of the platform and dimensions of the stand. A fastener 84 connects the rear braces 80 on one end to the platform 60. Brackets 86 connect the other ends of the rear braces 80 by quick connect pins 88 to the rear legs 66.

The lower ends 92 of the front legs 64 and the lower ends 94 of the rear legs 66 are provided with feet 98 that are connected by a pin 100 to the lower ends 92, 94 of the legs 64,66. Quick connect pins 102 connect the upper ends 72, 76 of the legs 64, 66 to brackets 104. Brackets 104 may be extruded as part of a plate that is attached to the platform 60. Quick connect pins 88, 102 each include a pin having a finger grasping ring on one end and a spring biased ball detent on the opposite end. The quick connect pins are inserted through corresponding holes in the brackets and the parts connected to the brackets. The quick connect pins allow for quick assembly and disassembly of the stand 62. Feet 98 may be similar in construction to the brackets used to connect other parts of the scissor support stand 62.

Rear braces 80 are connected by the fastener 84 to the rear edge of the platform 60 on their inner ends 106. The rear braces 80 are connected on their outer ends 108 to brackets 86. Brackets 86 are secured by quick connect pins 88 to the rear legs 66.

To disassemble the scissor support stand 62 from the platform 60 and break it down into its component parts it is only necessary to detach the braces 80 from the rear legs 66 by pulling the quick connect pins 88. After removing the quick connect pins 88, the upper ends 72 of the front legs and upper ends 76 of the rear legs may be disassembled from the platform 60. The front legs 64 and rear legs 66 may be folded to be parallel to each other for ease of transport.

In the embodiments shown in FIGS. 1–5, the front legs 14, 64 are longer than the rear legs 16, 66. The front legs 14 extend to a location on the ground forward of the tool to allow a user to stand on the longitudinal bar 40 while operating the tool or brake. It is also possible to reverse the stand so that the front legs 14, 64 extend rearward of the tool or brake to counteract tipping forces and stabilize the stand without utilizing a longitudinal bar 40.

Figure 6:
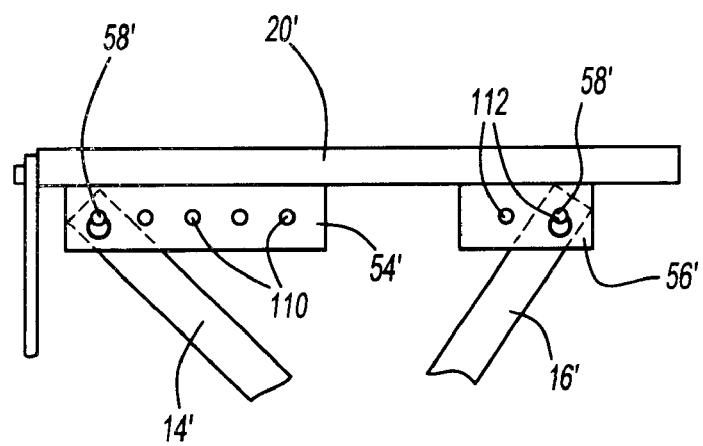
FIG. 6 is a fragmentary side elevation view of a support stand having height adjustment brackets.

Referring now to FIG. 6, either of the embodiments shown in FIGS. 1–5 may incorporate a height adjustment mechanism as illustrated in FIG. 6. Plate 20' has brackets 54' and 56' on the bottom face of plate 20'. A plurality of holes 110 and 112 are provided on brackets 54' and 56', respectively. The quick connect pins 58' may be used to anchor the front legs 14' to bracket 54' and the rear legs 16' to bracket 56' in a range of positions. The adjustment mechanism can be used to adjust the height of the stand by selecting different holes 110,112 to which the legs 14', 16' are connected.

Figure 7:
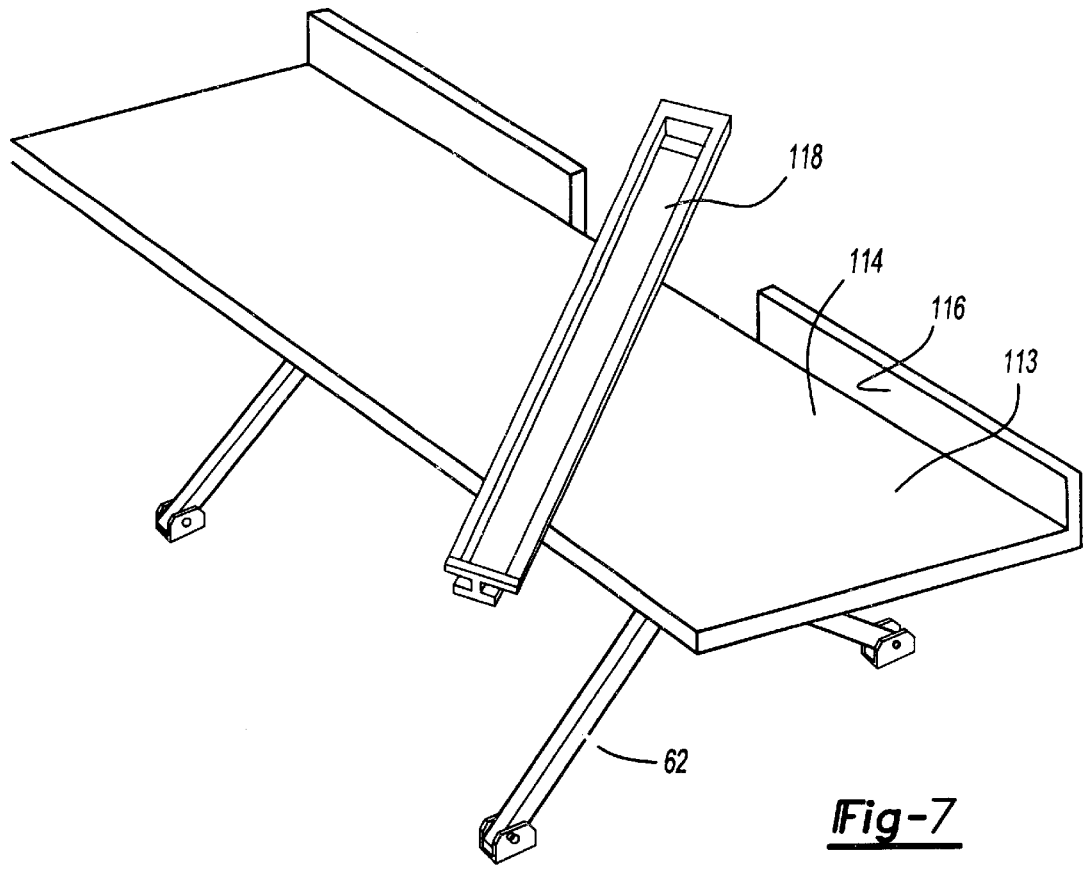
FIG. 7 is a perspective view of a saw table with the support stand of the present invention.

Referring now to FIG. 7, stand 62 can be used to support a saw table 113. Saw table 113 has a work surface 114 and a longitudinally extending guide 116. A pivotal guide 118 is pivotally secured to the saw table 113 and is used to guide a power saw when making angle cuts.

Figure 8:
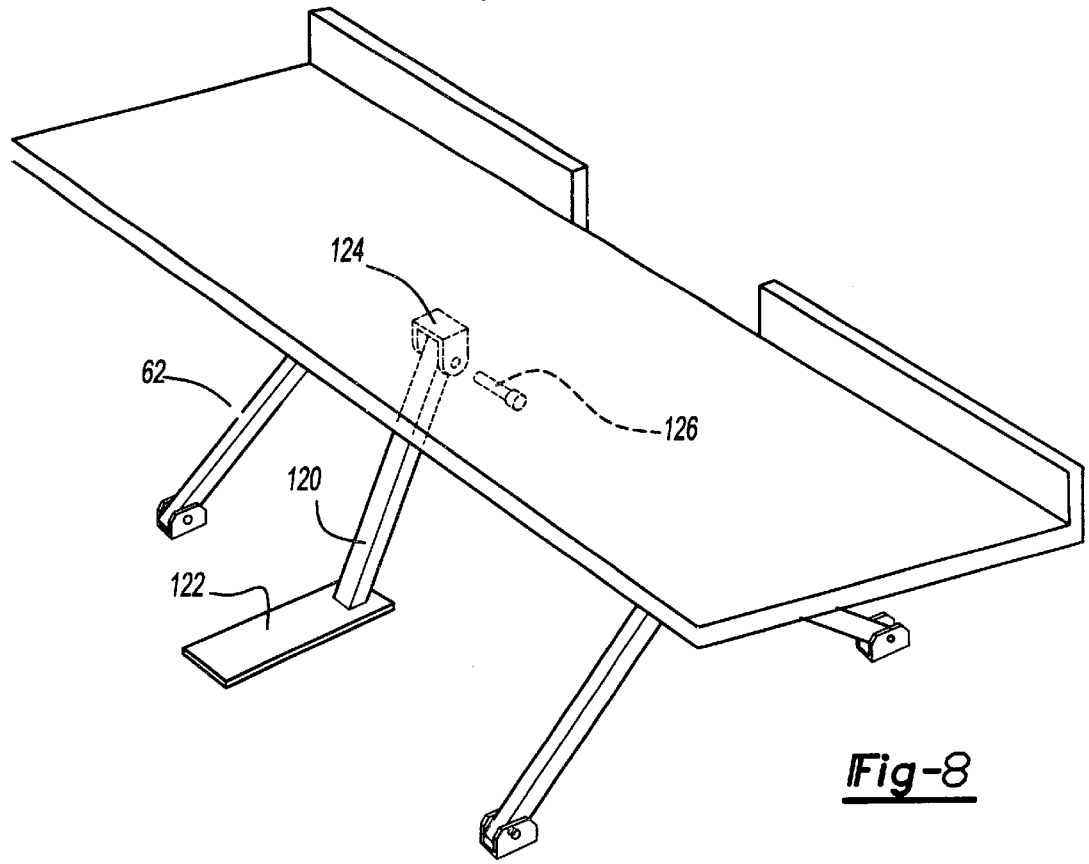
FIG. 8 is a perspective view of a work table with a support stand made in accordance with the present invention having a central brace.

Referring now to FIG. 8, an alternative embodiment of the stand 12 for a bending brake 10 is shown wherein the longitudinal bar 40 is eliminated. A central brace 120 has a foot pad 122 that may be stepped on to stabilize the stand 12 in the fore-and-aft direction. The central brace 120 may be detachably secured to the brake 10 by a quick connect pin to a bracket as previously described with reference to bracket 54 and pin 58 as shown in FIG. 1.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

We claim:

1. A portable stand and a portable tool in combination, comprising:

first and second front legs each being connected on an upper end to at least one plate supporting the tool, wherein the front legs support a rear portion of the plate and extend downwardly and forward toward the ground generally below the front of the tool;

first and second rear legs each being connected on an upper end to the at least one plate to support a front portion of the plate and extend downwardly and rearward toward the ground, each of the rear legs being connected to one of the front legs by a pivot at an intermediate location on the front and rear legs; and a pair of rear braces connected between a portion of each of the first and second rear legs and an intermediate portion of the tool.

2. The portable stand in the combination of claim 1 wherein the rear braces are connected to the rear legs below the pivot.

3. The portable stand in the combination of claim 1 wherein the at least one plate comprises right and left plates on right and left sides of the tool each extending between the upper ends of one front leg and one rear leg.

4. The portable stand in the combination of claim 1 further comprising feet secured to the lower ends of each of the front and rear legs.

5. The portable stand in the combination of claim 4 herein the feet are connected to the lower ends of each of the front and rear legs by a pivot connection member.

6. The portable stand in the combination of claim 1 wherein a foot stand is connected between the lower ends of the front legs, the foot stand comprising a planar member on which a person may stand when using the tool.

7. The portable stand in the combination of claim 1 wherein the first and second front legs are pivotally connected to a foot stand wherein the first and second front legs may be disconnected from the tool or brake and pivoted to a position coplanar with the foot stand.

8. A portable stand and a portable tool in combination, comprising:

first and second front legs each being connected on an upper end to at least one plate supporting the tool, wherein the front legs support a rear portion of the plate and extend downwardly and forward toward the ground generally below the front of the tool;

first and second rear legs each being connected on an upper end to the at least one plate to support a front portion of the plate and extend downwardly and rearward toward the ground, each of the rear legs being connected to one of the front legs by a pivot at an intermediate location on the front and rear legs; and wherein the upper ends of the front and rear legs are each connected to the at least one support plate by a bracket having a series of holes arranged in a row extending transversely relative to the plate to permit adjustment of the height of the plate.

9. The portable stand in the combination of claim 8 wherein the upper ends of the front and rear legs are each connected to the bracket by a quick connect pin.

10. A portable stand and a portable tool in combination, comprising:

first and second front legs each being connected on an upper end to at least one plate supporting the tool, wherein the front legs support a rear portion of the plate and extend downwardly and forward toward the ground generally below the front of the tool;

first and second rear legs each being connected on an upper end to the at least one plate to support a front portion of the plate and extend downwardly and rearward toward the ground, each of the rear legs being connected to one of the front legs by a pivot at an intermediate location on the front and rear legs; and wherein the portable tool is a portable bending brake and the upper ends of the front and rear legs are each connected to the portable bending brake by a bracket and a quick connect pin, whereby the legs may be disconnected from the portable bending brake by removing the quick connect pins and folded by pivoting the front legs and rear legs to be parallel to each other, and wherein a pair of rear braces are connected between a portion of the rear legs located below the pivot and a central portion of the bending brake, the rear braces being connected to the rear legs by a quick connect pin and being pivoted to fold upwardly behind the portable bending brake.

11. A portable stand and a portable tool in combination, comprising:

first and second front legs each being connected on an upper end to at least one plate supporting the tool, wherein the front legs support a rear portion of the plate and extend downwardly and forward toward the ground generally below the front of the tool;

first and second rear legs each being connected on an upper end to the at least one plate to support a front portion of the plate and extend downwardly and rearward toward the ground, each of the rear legs being connected to one of the front legs by a pivot at an intermediate location on the front and rear legs; and wherein a central support including a foot pad is secured to the plate.

12. A portable bending brake stand and a portable bending brake, in combination comprising:

a pair of front legs each being connected on an upper end to a rear portion of the bending brake;

a pair of rear legs each being connected on an upper end to a front portion of the bending brake and each being connected to one of the front legs by a pivot pin at an intermediate location on the front and rear legs; and a pair of rear braces connected between a portion of the rear legs located below the pivot pins and a central portion of the bending brake.

13. The portable bending brake stand and portable bending brake combination of claim 12 wherein attachment plates are provided at the upper ends of front and rear legs on each side of the portable bending brake that connect the front and rear legs to the portable bending brake.

14. The portable bending brake stand and portable bending brake combination of claim 12 further comprising feet secured to the lower ends of each of the front and rear legs.

15. The portable bending brake stand and portable bending brake combination of claim 14 wherein the feet are connected to the lower ends of each of the front and rear legs by a pivot connection member.

16. The portable bending brake stand and portable bending brake combination of claim 12 further comprising a foot stand comprising an elongated member extending longitudinally between and connected to a lower end of the front legs.

17. The portable bending brake stand and portable bending brake combination of claim 12 wherein a foot stand is connected between the lower ends of the front legs, the foot stand comprising a planar member on which a person may stand when using the portable bending brake.

18. The portable bending brake stand and portable bending brake combination of claim 17 wherein the front legs are pivotally connected to the foot stand wherein the front legs may be disconnected from a tool and pivoted to a position coplanar with the foot stand.

19. A portable bending brake stand and a portable bending brake, in combination comprising:

a pair of front legs each being connected on an upper end to a rear portion of the bending brake;

a pair of rear legs each being connected on an upper end to a front portion of the bending brake and each being connected to one of the front legs by a pivot pin at an intermediate location on the front and rear legs; and wherein the upper ends of the front and rear legs are each connected to the portable bending brake by a bracket having a series of holes arranged in a row extending transversely relative to the bending brake to permit adjustment of the height of the bending brake.

20. The portable bending brake stand and portable bending brake combination of claim 19 wherein the upper ends of the front and rear legs are each connected to the bracket by a quick connect pin.

21. A portable bending brake stand and a portable bending brake, in combination comprising:

a pair of front legs each being connected on an upper end to a rear portion of the bending brake;

a pair of rear legs each being connected on an upper end to a front portion of the bending brake and each being connected to one of the front legs by a pivot pin at an intermediate location on the front and rear legs; and wherein the upper ends of the front and rear legs are each connected to the portable bending brake by a bracket and a quick connect pin, whereby the legs may be disconnected from the portable bending brake by removing the quick connect pins and folded by pivoting the front legs and rear legs to be parallel to each other, and wherein a pair of rear braces are connected between a portion of the rear legs located below the pivot pins and a central portion of the bending brake, the rear braces being connected to the rear legs by a quick connect pin and being pivoted to fold upwardly behind the portable bending brake.

22. A portable bending brake stand and a portable bending brake, in combination comprising:

a pair of front legs each being connected on an upper end to a rear portion of the bending brake;

a pair of rear legs each being connected on an upper end to a front portion of the bending brake and each being connected to one of the front legs by a pivot pin at an intermediate location on the front and rear legs; and wherein a central support including a foot pad is secured to the bending brake.

* * * * *